(12) United States Patent
Depondt (10) Patent No.: US 8,850,653 B2
(45) Date of Patent: Oct. 7, 2014

(54) ADAPTER FOR CONNECTING A CONNECTING ELEMENT AT THE END OF A WIPER ARM TO A WIPER BLADE IN PARTICULAR OF FLAT BEAM CONSTRUCTION

(75) Inventor: Helmut Depondt, Kessel-Lo (BE)

(73) Assignee: Robert Bosch GmbH, Stuttgart (DE)

( * ) Notice: Subject to any disclaimer, the term of this patent is extended or adjusted under 35 U.S.C. 154(b) by 209 days.

(21) Appl. No.: 13/510,520

(22) PCT Filed: Sep. 21, 2010

(86) PCT No.: PCT/EP2010/063918
§ 371 (c)(1),
(2), (4) Date: Jul. 25, 2012

(87) PCT Pub. No.: WO2011/060979
PCT Pub. Date: May 26, 2011

(65) Prior Publication Data
US 2012/0279008 A1  Nov. 8, 2012

(30) Foreign Application Priority Data

Nov. 17, 2009  (DE) .......................... 10 2009 046 788
Sep. 21, 2010  (DE) .......................... 10 2010 041 152

(51) Int. Cl.
*B60S 1/40*  (2006.01)
*B60S 1/38*  (2006.01)

(52) U.S. Cl.
CPC .............. *B60S 1/4003* (2013.01); *B60S 1/387* (2013.01)
USPC ...................................................... 15/250.32

(58) Field of Classification Search
USPC ........................... 15/250.32, 240.43, 250.361, 15/250.44–250.48, 250.43
See application file for complete search history.

(56) References Cited

U.S. PATENT DOCUMENTS

| 7,299,520 | B2 * | 11/2007 | Huang ....................... 15/250.32 |
| 2008/0289133 | A1 | 11/2008 | Kim |
| 2009/0199357 | A1 | 8/2009 | Thienard |

FOREIGN PATENT DOCUMENTS

| CN | 101311043 | 11/2008 |
| DE | 202008011314 | 10/2008 |
| EP | 1849666 | 10/2007 |
| KR | 100891195 | 4/2009 |
| KR | 100903374 | 6/2009 |
| WO | 2009071372 | 6/2009 |

OTHER PUBLICATIONS

PCT/EP2010/063918 International Search Report dated Nov. 8, 2010 (Translation and Original, 5 pages).

* cited by examiner

*Primary Examiner* — Mark Spisich
*Assistant Examiner* — Andrew A Horton
(74) *Attorney, Agent, or Firm* — Michael Best & Friedrich LLP (57) ABSTRACT

The invention is based on an adapter (16) for connecting a connecting element (30, 32, 34, 36, 38, 40) at the end of a wiper arm (18, 20, 22, 24, 26, 28) to a wiper blade (10) in particular of flat beam construction, wherein the adapter (16) has a base element (42). It is proposed that the base element (42) have a U-shaped cross-sectional profile which is formed from a base (56) and two side walls (48) and which, at that end side thereof which faces away from the wiper arm (18, 20, 22, 24, 26, 28), is closed off by a closure cap (44), that spring arms (68) be integrally formed on the side walls (48) of the base element (42), which spring arms (68) extend in the longitudinal direction (124) toward the closure cap (44), engage into the latter and latch with buttons (70) into cutouts (84) which are provided in side walls (82) of the closure cap (44), and in that longitudinally directed bars (78) are arranged on the inner sides of the side walls (82) of the closure cap (44), which bars (78) are guided in a movable manner in cutouts (60) of the side walls (48) of the base element (42) when the buttons (70) are released, and which bars, in the closed state, block transversely running assembly gaps (62) and close off receiving chambers (66) for locking cams (104, 120).

19 Claims, 6 Drawing Sheets

ADAPTER FOR CONNECTING A CONNECTING ELEMENT AT THE END OF A WIPER ARM TO A WIPER BLADE IN PARTICULAR OF FLAT BEAM CONSTRUCTION

BACKGROUND OF THE INVENTION

The invention is based on an adapter for connecting a connecting element at the end of a wiper to a wiper blade, in particular of flat beam construction.

The German patent publication DE 20 2005 021 307 U1 discloses a connecting device for the articulated connection of a wiper blade of flat beam construction, which connecting device is suitable for different wiper arms. The connecting device comprises at least one single-part or multi-part connector element which is fastened fixedly, but releasably, to a supporting element in the form of spring rails. An adapter is provided between each wiper arm and the wiper blade, which on the one hand comprises connecting options for the connector element and on the other hand connecting options for one of the wiper arms or for connecting elements, which are fixedly connected to the respective wiper arm or integrally formed on the same. A joint, the joint axis of which extends transversely with respect to the longitudinal direction of the wiper blade, is disposed between one of the connecting elements and an adapter, which is connected in a torque-proof manner to the connector element, or between a part of the adapter, which is connected in a torque-proof manner to said connector element and a part of the adapter, which is connected in a torque-proof manner to the connecting element. There are therefore three different adapters for three different connecting elements of the wiper arms.

The connector element is suitable for a wiper arm having a hook-shaped end or a hook-shaped connecting element or is suitable for a wiper arm having an end or connecting element comprising a lateral bearing pin and a bridge in accordance with a known sidelock principle for a wiper arm having an end or connecting element, whereat the wiper arm runs substantially in a straight line above the wiper blade, and is connected to the connector element in accordance with the toplock principle.

SUMMARY OF THE INVENTION

According to the invention, the base element 42 has a U-shaped cross-sectional profile which is formed from a base and two side walls and which, at that end side thereof which faces away from the wiper arm is closed off by a closure cap. Spring arms are integrally formed on the side walls of the base element, which spring arms extend in the longitudinal direction, engage into the closure cap and latch with buttons into cutouts which are provided in the side walls of said closure cap. The cutouts can, for example, be designed as apertures or as recesses so that the buttons in the first case can be actuated through the apertures, whereas in the second case said buttons are covered to the outside by the side walls and can be released using a tool. In addition, longitudinally directed bars are arranged on the inner sides of the side walls of said closure cap, which bars are guided in a movable manner in cutouts of the side walls of the base element when said buttons are not latched in the cutouts in the side walls of said closure cap. In the closed state, when the buttons are latched in the cutouts of the side walls of said closure cap, the bars block transversely running assembly gaps and thereby close off receiving chambers for locking cams. By means of this device, connecting elements of wiper arms or a protective cap can be connected to the adapter in a loss-proof manner. Said adapter can in turn be mounted in a usual manner on a connecting element attached to the wiper blade.

During assembly, the corresponding wiper arms or respectively the first and second connecting elements thereof, which have an open U-shaped cross-sectional profile towards the adapter and comprise inwardly facing locking cams on the lower edges of the side walls thereof, are inserted in the direction of a vertical axis into the assembly gaps of the side walls of the base element and up into the receiving chambers at the ends of the assembly gaps, wherein the closure cap assumes an open position. When the locking cams are situated in the receiving chambers, the closure cap is closed, wherein the bars block the assembly gaps above said receiving chambers so that the locking cams can no longer release from said receiving chambers. In the end position, the buttons, which are located at the ends of the spring arms connected to the base element latch into the cutouts of the side walls of the closure cap, and therefore said closure cap is secured from being opened unintentionally.

During disassembly, the buttons are pressed inwardly so that the closure cap can again be pushed into the open position and the bars unblock the assembly gaps. A stop advantageously limits the opening travel of the bars; and therefore during assembly and disassembly, said bars cannot inadvertently slide out of the cutouts of the base element, in which they are guided.

According to one embodiment of the invention, it is proposed that in the closed state, the bars engage with the free ends thereof in cutouts on the sides of the assembly gaps opposite to the end sides of the bars. In so doing, the bars are also supported at the free ends thereof in the closed state, whereby they are also able to withstand high impact loads. It is therefore advantageous if the cutouts have in each case a detent on one of the edges thereof, which locks with a detent edge on the free end of the bars and only releases said detent edge when an elevated releasing force occurs in the longitudinal direction of the bars.

The spring arms advantageously run offset towards the outside with respect to the side walls and thus form shoulders, which serve as stops for end sides of the third or fourth connecting element.

In order to minimize the play between the connecting element and the adapter, it is advantageous for the adapter to have a play compensation button at the end thereof facing the wiper arm, which button is connected to an intermediate base via a spring tongue, said intermediate base connecting the two side walls of the base element. The play compensation button interacts with a matching opening in the corresponding first or second wiper arm. Said play compensation button can advantageously have a detent edge on the side thereof facing the spring arms and serve as a further securing means for the first or second connecting element. In the region of the play compensation button, the base element has additionally a play compensation recess on the exterior side of the side walls. Said play compensation recesses can interact with first play compensation ribs of corresponding wiper arms, e.g., of the first connecting element of the first wiper arm and minimize the lateral play of the wiper blade. Finally, the base element can comprise play compensation surfaces in the region of the spring tongue on the exterior walls of the side walls thereof. Said compensation surfaces interact with second play compensation ribs of corresponding wiper arms, e.g., of the second connecting element of the second wiper arm and likewise minimize the lateral play of the wiper blade. Starting at the base of the base element and extending to the upper edge of the side walls, the play compensation surfaces are slightly inclined to the inside in order to facilitate assembly.

In a further configuration level, the adapter comprises a protective cap, which has a U-shaped cross-sectional profile formed from a base and two side walls, said profile encompassing the base element laterally and from above with the side walls and the top wall thereof. The protective cap flushly adjoins with the end face thereof the opposing end face of the closure cap; wherein in the assembled state, locking cams on the interior sides of the side walls of the protective cap engage in the receiving chambers at the end of the assembly gaps of the base element. The end face of the protective cap facing the wiper arm has an aperture. Said aperture is used for the assembly of additional different wiper arms.

In order to secure corresponding wiper arms, the protective cap has lateral, inwardly resiliently pliable detent wings on the end thereof facing the wiper arm, said detent wings comprising angled stops and stops running approximately perpendicularly to the longitudinal direction. For the same purpose, it is proposed according to a further embodiment of the invention that the protective cap has a detent cam in the region of the aperture, which is located on the end face and faces the wiper arm. Said detent cam interacts with a corresponding detent aperture of the associated fifth wiper arm.

Whereas the third to the sixth wiper arm can be mounted with the corresponding third to sixth connecting elements if the adapter runs substantially parallel to the wiper blade, the adapter for mounting the first or second wiper arm is rotated about an angle α, preferably between 4° and 8° with respect to the free end of the wiper blade. As a result of the varying angle α, a sufficient clearance is obtained for the mounting of the first and second wiper arm. It is further possible, to insert the third to the fifth connecting elements into the adapter through the aperture on the end face and to press the play compensation button downwards.

In order to be able to mount a wiper arm according to the side lock principle, the base element has a hub, which is open towards the top and above which the side walls of the base element project, wherein said side walls are configured clip-like in the region of the hub, and the protective cap has a bearing aperture aligned to the hub at least in one side wall.

BRIEF DESCRIPTION OF THE DRAWINGS

Further advantages ensue from the following description of the drawings. Exemplary embodiments are depicted in the drawings. The drawings, the description and the claims contain numerous features in combination. The specialist in the field should also advantageously consider the features individually and put them together in further useful combinations.

In the drawings.

DETAILED DESCRIPTION

Figure 1:
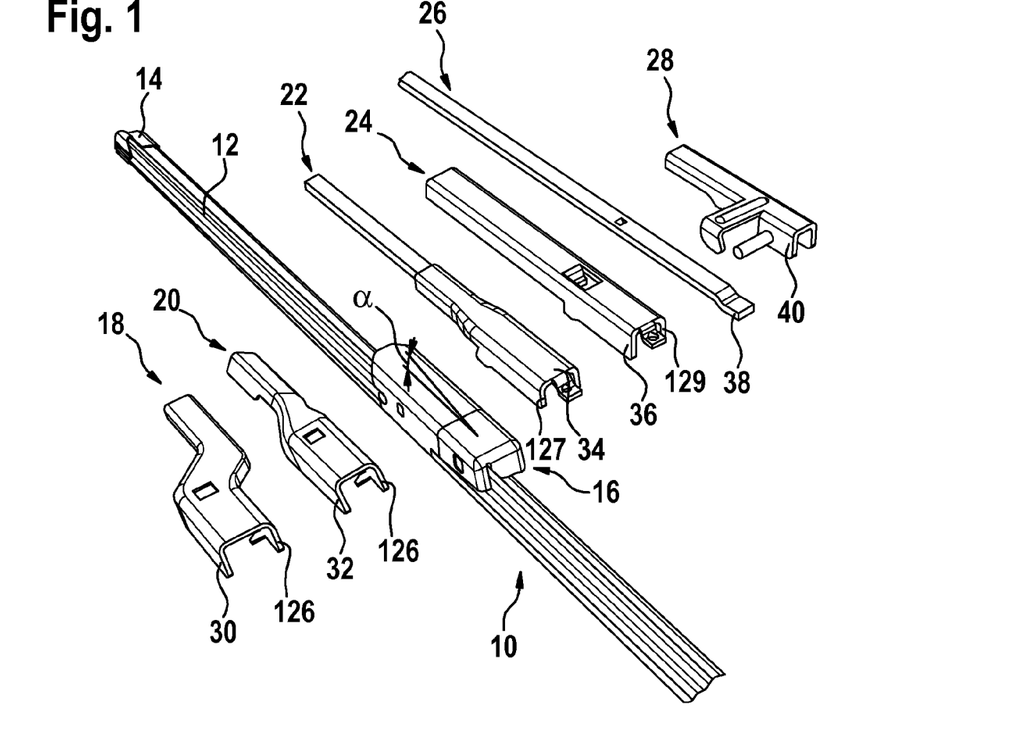
FIG. 1 shows a perspective partial view of six wiper arm ends in a set and a wiper blade comprising an adapter according to the invention.
Figure 2:
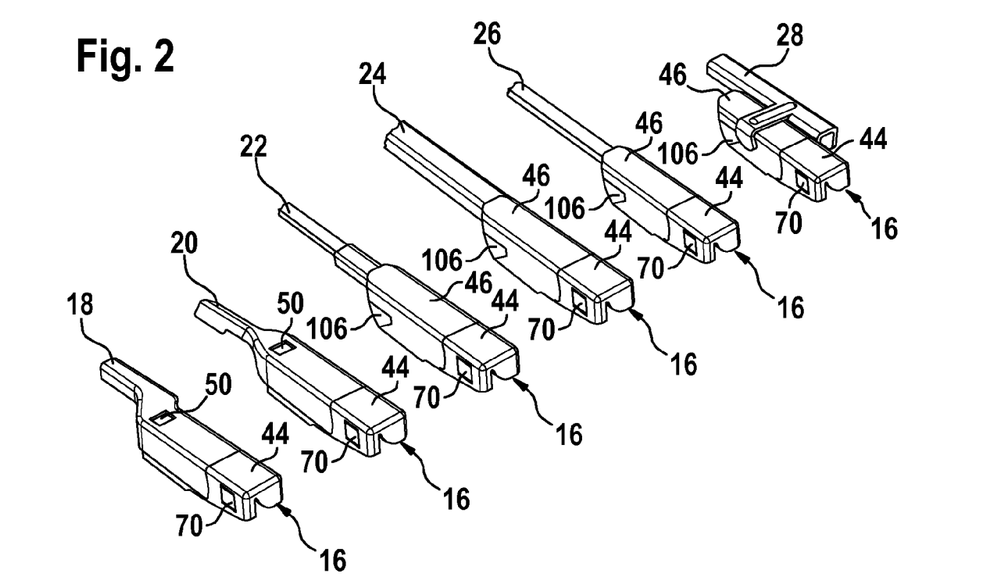
FIG. 2 shows a perspective partial view of the six wiper arm ends according to FIG. 1 mounted on the adapter according to the invention.

The wiper blade 10 depicted in FIG. 1 has a wiper strip, which is covered by a spoiler 12, which has end caps 14 on the ends thereof. The spoiler 12 is connected in a conventional manner to the wiper strip, which is not visible, via a supporting element in the form of one or a plurality of spring rails, which are likewise not visible. A connector element, on which an adapter 16 sits, is attached in a conventional manner to the support element. The adapter 16 facilitates the articulated connection of the wiper blade 10 to six different wiper arms 18, 20, 22, 24, 26 and 28. Said wiper arms have different connecting elements 30, 32, 34, 36, 38 and 40, which are detachably connected to said adapter 16. The connecting elements 30, 32, 34, 36, 38, 40 can be integral constituents of the wiper arms 18, 20, 22, 24, 26, 28 or be rigidly connected to said wiper arms 18, 20, 22, 24, 26, 28 as individual components. FIG. 2 shows the six wiper arms 18, 20, 22, 24, 26, 28 mounted to said adapter 16.

Figure 3:
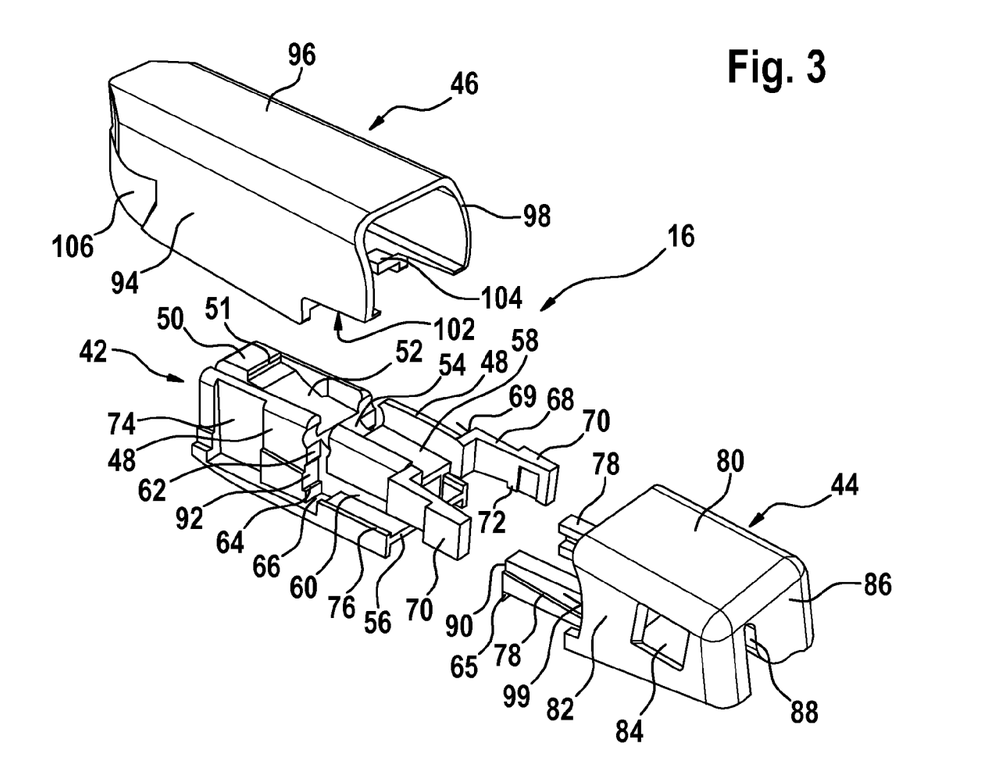
FIG. 3 shows the adapter according to the invention in a perspective exploded view.
Figure 4:
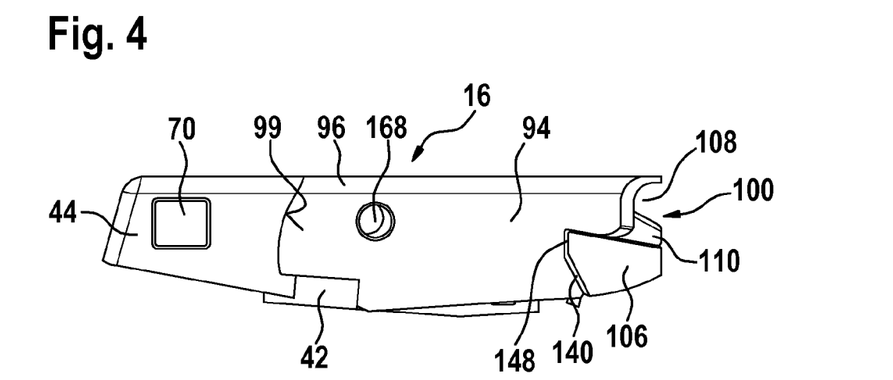
FIG. 4 shows the inventive adapter pursuant to FIG. 3 in the assembled state.

The adapter 16 comprises a base element 42 and a closure cap 44 for connecting to a first wiper arm 18 or a second wiper arm 20, whereas a protective cap 46 is required for connecting to a third wiper arm 22 or fourth wiper arm 24 or fifth wiper arm 26 or sixth wiper arm 28. The individual parts of the adapter 16 are depicted in FIG. 3. The base element 42 has two side walls 48, which are connected to each other by means of a base 56 and an intermediate base 58 and project above the same in the direction of a vertical axis. The end face of the base element 42 facing away from the wiper arms 18, 20, 22, 24, 26, 28 is covered by the closure cap 44. Said closure cap has a U-shaped cross-sectional profile, which is open towards the spoiler 12 and is formed from two side walls 82 and a top wall 80 connecting said two side walls. In the direction of the free end, said closure cap 44 has an end wall 86 comprising a connection profile 88 for the spoiler 12. Bars 78 are integrally formed on the inner sides of the side walls 82, which bars run in the longitudinal direction 124 and in the mounted state are guided in a longitudinally movable manner in cutouts 60 on the outer sides of the side walls 48 of the base element 42. The cutouts 60 are delimited downwards by the base 56, which has guide edges 76 on the longitudinal sides thereof in the region of the cutouts 60.

If the closure cap 44 is closed, the bars 78 extend across assembly gaps 62 in the side walls 48 of the base element 42, which run transversely to said bars. In the closed state, said bars 78 block the assembly gaps 62 so that receiving chambers 66 form on the end of the assembly gaps 62 in the direction of the base 56. In order to ensure said bars 78 are securely held on the free ends thereof, cutouts 92 are provided on the sides of said assembly gaps 62 which are opposite to the end sides 90 of said bars 78. Said bars 78 engage to some extent into the cutouts 92 and by means of detent edges 65 in the region of the end face 90 thereof latch with detents 64 on the lower edges of said cutouts 92.

On the end face of the base element 42 facing the closure cap 44, spring arms 68 running in the longitudinal direction are formed on the side walls 48. Said spring arms run outwardly offset with respect to the side walls 48 of the base element 42 and have buttons 70 facing laterally outwards on the free ends thereof, said buttons latching from the inside into cutouts 84 in the side walls 82 of the closure cap 44. As a result of the offset, the spring arms 68 form shoulders 69, which serve as stops for end sides 127, 129 of the third or fourth connecting element 34, 36 of the third or fourth wiper arm 22, 24.

The cutouts 84 of the closure cap 44 can be designed as apertures or recesses. The spring arms 68 fix the final assembly position of the closure cap 44. Said spring arms further have at least one stop 72, whereby the opening movement of said closure cap 44 is delimited so that the bars 78 also remain guided in the cutouts 60 of the base element 42 in the open position of said closure cap 44. As a result, the assembly and disassembly of the wiper arms 18, 20 as well as the protective cap 46 are substantially simplified.

The base element 42 has a play compensation button 50, which is connected to the intermediate base 58 via a spring tongue 52, in the region of the end face thereof on the wiper arm side in order to mount the first wiper arm 18 and the second wiper arm 20. The play compensation button can further serve as an additional securing means of the adapter 16. For this reason, it is advantageous for said button to have a detent edge 51 on the side thereof facing the spring arms 68. In the region of the play compensation button 50, play compensation recesses 74 are also provided in the outer sides of the side walls 48. Play compensation ribs 118 of the second connecting element 32 of the second wiper arm 20 fit into said compensation recesses. Play compensation surfaces, which interact with the first play compensation ribs 117 of the first connecting element 30 of the first wiper arm 18 adjoin said play compensation recesses 74 in the longitudinal direction 124. Starting from the base 56 of the base element 42 up to the upper edges of the side walls 48, the play compensation surfaces are inclined slightly inwards in order to facilitate the assembly of the first connecting element 30. Said play compensation recesses 74 as well as said play compensation surfaces minimize together with the first and second play compensation ribs 117, 118 the lateral play of the wiper blade 10 and therefore ensure a precise lateral guiding of the wiper blade 10.

In order to mount the sixth wiper arm 28 having a sixth connecting element 40 to a wiper blade in accordance with a sidelock principle, the base element 42 comprises an open hub 54 at the open end of the assembly gaps 62 in the intermediate base 58. Side walls 48 project above the hub 54, wherein the protruding parts of the side walls 48 are configured as clips in order to hold a bearing pin 164 of the sixth connecting element in the hub 54.

The protective cap 46 has a U-shaped cross-sectional profile which is open to the base element 42 and is formed from two side walls 94 and a top wall 96, which connects the side walls 94 to one another. The side walls 94 have cutouts 102 on the lower longitudinal edges thereof that face the base element 42 so that said side walls 94 flushly adjoin with the guide edges 76 of the intermediate base 58. The end face 98, which is designed in a convex manner, adjoins an end face 99 of the closure cap 44, which is correspondingly designed in a concave manner, and therefore the side walls 82 and the top wall 80 of the closure cap 44 flushly adjoin with the side walls 94 and the top wall 96 of the protective cap 46.

Locking cams (104) facing inwards adjoin the cutouts 102 of the protective cap 46 at the end on the wiper arm side, said locking cams are pushed through the assembly gaps 62 and in the assembly end position are suitably inserted into the receiving chambers 66. A compound structure of the coupled parts 42, 44, 46 in the longitudinal direction thus results via the locking cams 104, the spring arms with the button 70, the cutouts 84 in the side walls 82 of the closure cap 44 and in the end sides 98, 99 of the protective cap 46 or respectively the closure cap 44.

The protective cap 46 further has lateral detent wings 106 at the end on the wiper arm side. Said detent wings have in each case a stop 148 running approximately transversely to the longitudinal direction and an angled stop 140, wherein both stop surfaces face the closure cap 44. The angled stop 140 encloses an obtuse angle with the stop 148. An aperture 108, through which the connecting elements 34, 36, 38 of the wiper arms 22, 24, 26 can be mounted, is situated on the end face 100 of the protective cap 46 on the wiper arm side. A detent nose 110, which is required for mounting the fifth wiper arm 26, is mounted on the protective cap 46 in the region of the aperture 108.

Figure 5:
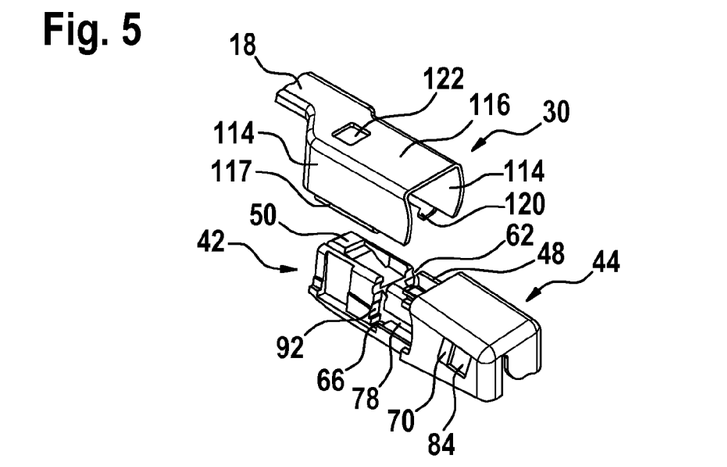
FIG. 5 and FIG. 6 show a first wiper arm while being mounted to an adapter according to the invention.
Figure 6:
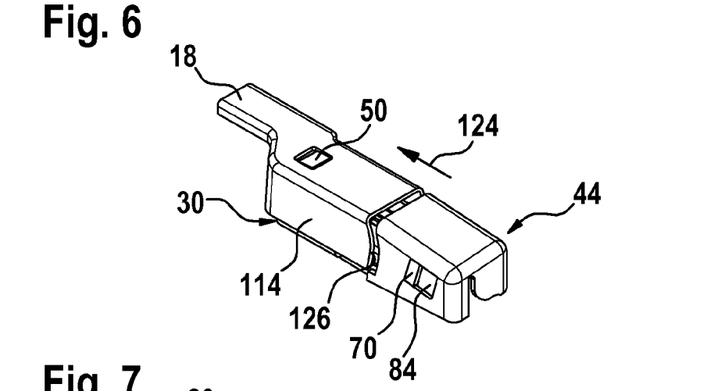

FIG. 5 and FIG. 6 show the mounting of the first wiper arm 18 to an adapter 16 according to the invention. Only the base element 42 and the closure cap 44 are required for this purpose. In the initial position, said closure cap 44 is pushed in the longitudinal direction 124 until reaching the stop 72 so that the assembly gaps 62 are free. The first connecting element 30 of the first wiper arm 18 can thereby be pushed in the direction of a vertical axis over the side walls 48 of the base element, whereby the locking cams 120 engage in the assembly gaps 62 and in the end position lie in the receiving chambers 66 at the end of said assembly gaps 62. In this position, first play compensation ribs 117 of the side walls 114 of the first connecting element 30 are supported at the base or respectively at the guide edge 76. Said first play compensation ribs fit without play against the first play compensation surfaces and therefore ensure a good lateral guide. The side walls 114 are connected to each other by a top wall 116.

In a second step, the closure cap 44 is moved in the longitudinal direction 124 onto the first wiper arm until the button 70 on the spring arms 68 latches from the inside into the cutouts 84 of the side walls 82 of the closure cap 44, said cutouts being designed as apertures. The end position is depicted in FIG. 2. In this state, the bars 78 block the assembly gaps 62 so that the locking cams 120 are caught in the receiving chambers 66. At the same time, the play compensation button 50 latches into a corresponding aperture 122 of the first connecting element 30, whereby the connecting element 30 is held largely free of play via the face edges 126 thereof, and the closure cap 44 and the spring arms 68 are held largely free of play with the buttons 70. The play compensation button 50 can also serve as a further securing mechanism. For this reason, said play compensation button has a detent edge 65 on the side facing the spring arms 68.

Figure 7:
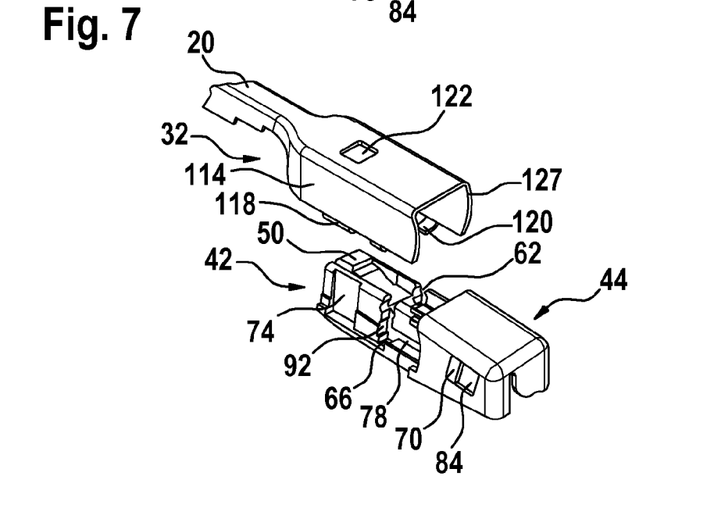
FIG. 7 shows a second wiper arm while being mounted to an adapter according to the invention.

Whereas in the embodiment pursuant to FIGS. 5 and 6, the first wiper arm 18 extends above the wiper blade 10 however laterally offset with respect to the latter, the second wiper arm 20 extends above said wiper blade 10 (FIG. 2, FIG. 7). The second connecting element 32 of said second wiper arm 20 is similarly constructed as the first connecting element 30 of the first wiper arm 18 and is mounted in the same way, wherein the locking cams 120 are likewise inserted into the receiving chambers 66. In contrast to the first wiper arm 18, the second connecting element 32 of the second wiper arm 20 has second play compensation ribs 118 on the free longitudinal sides of the side walls 114, said compensation ribs fitting into the play compensation recesses 74 on the outer sides of the side walls 48 and minimizing the lateral play of the wiper blade 10. In the assembled state, the convex end sides 127 of the second connecting element 32 flushly rest against the concave end sides 99 of the closure cap 44.

Figure 8:
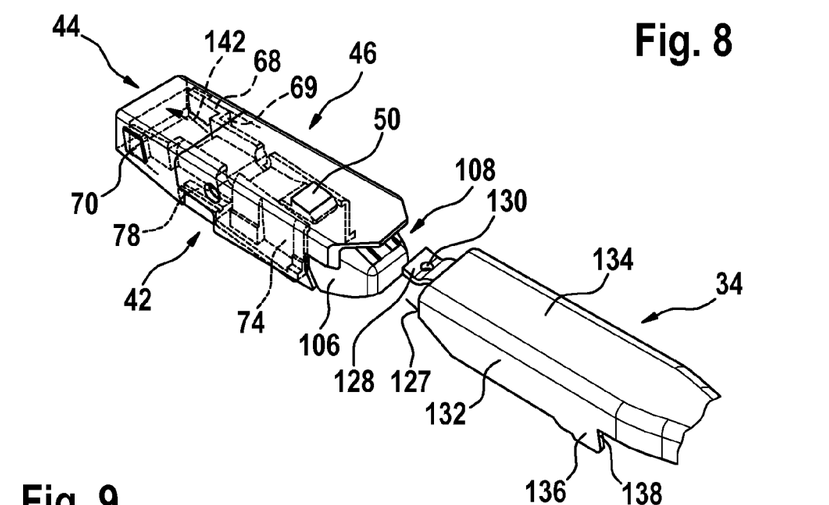
FIG. 8 to FIG. 10 show a third wiper arm while being mounted to an adapter according to the invention.

The third wiper arm 22 has an integrally formed third connecting element 34, which has a U-shaped cross-sectional profile and two side walls 132 which are connected to each other by a top wall 134. A tongue 128 with a hole 130 is integrally formed on the end face of the top wall 134. In the longitudinal direction offset with respect to the third wiper arm 22, projections 136 are integrally formed on the free longitudinal edges of the side walls 132, the border of said projections on the wiper arm side forming an undercut 138.

Figure 9:
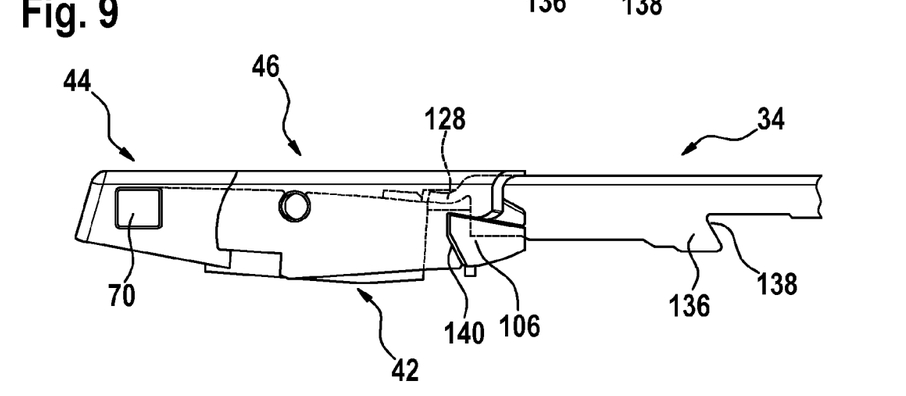
Figure 10:
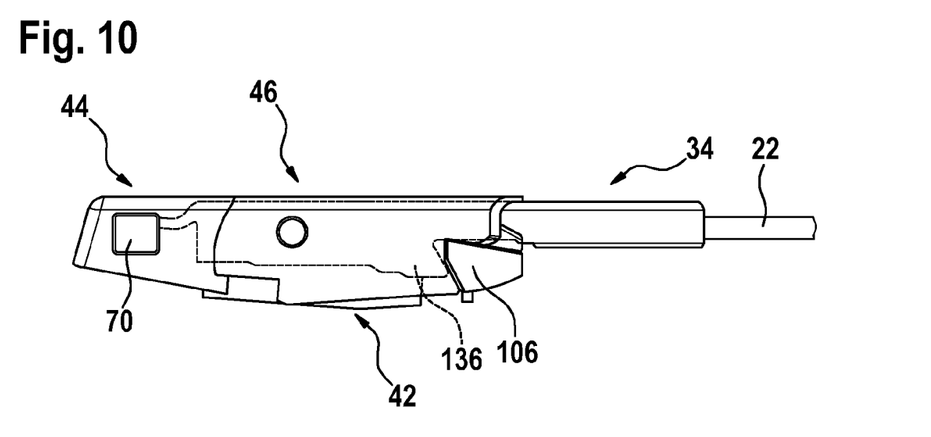

During assembly, the adapter 16 is aligned approximately parallel to the wiper blade 10. The third connecting element 34 is pushed through an aperture 108 on the wiper side of the protective cap 46, wherein the tongue 128 presses the detent cams 154 of the protective cap 46 and the play compensation button 50 of the base element 42 downwards. At the same time, the lateral detent wings 106 are pressed inwardly in a resiliently pliable manner until the front end side 127 of the third connecting element 34 contacts the shoulders 69 of the spring arms 68 and the detent wings 106 latch laterally into the undercuts 138 of the third connecting element 34. In so doing, the angled stops 140 of the detent wings 106 fit closely against the opposing edges of the undercuts 138 of the third connecting element 34, and therefore the third connecting element 34 is held in the longitudinal direction 124 between the shoulders 69 on the one hand and the angled stops 140 on the other hand. In order to laterally guide the wiper blade 10, the inner sides of the side walls 132 of the third connecting element 34 fit approximately without play against the play compensation surfaces of the base element 42.

Figure 11:
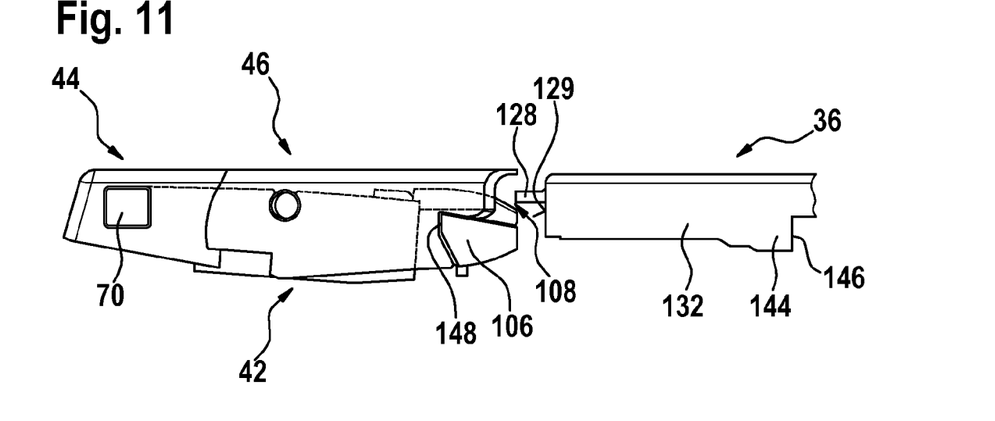
FIG. 11 shows a fourth wiper arm while being mounted to an adapter according to the invention.

The fourth wiper arm 24 likewise has an integrally formed fourth connecting element 36. Said connecting element 36 differs from the third connecting element 34 by the form of the lateral projections 144, which have stop edges 146 on the wiper arm side that run substantially perpendicularly to the longitudinal direction 124 and interact with the stops 148 of the detent wings 106 which also run perpendicularly to the longitudinal direction 124. Otherwise the assembly is the same as with the third wiper arm 22, wherein in the assembled position, the end side 129 of the fourth connecting element 36 fits closely against the shoulders 69 of the spring rail 68 and the side wall 132 of the fourth connecting element 36 fits approximately without play against the play compensation surfaces of the base element 42.

Figure 12:
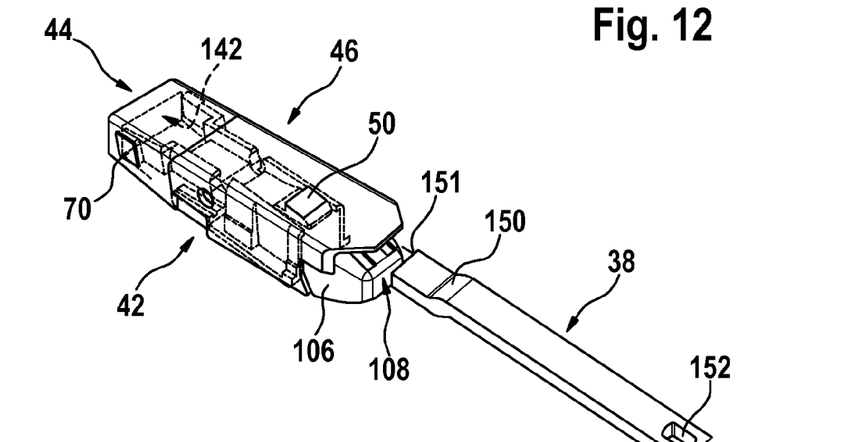
FIG. 12 and FIG. 13 show a fifth wiper arm while being mounted to an adapter according to the invention and FIG. 14 shows a sixth wiper arm while being to an adapter according to the invention.
Figure 13:
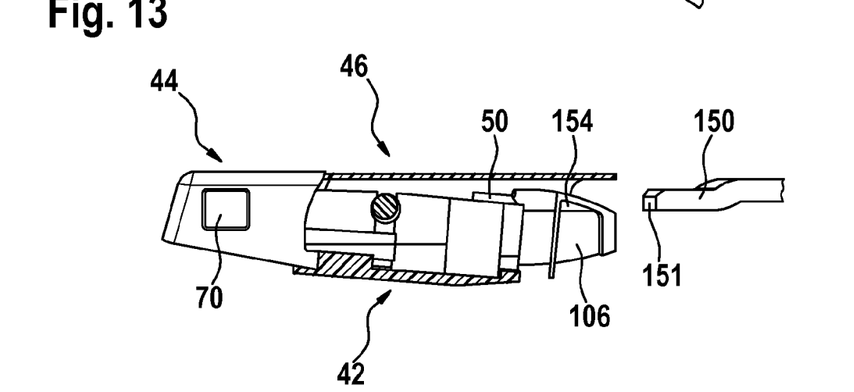

The fifth wiper arm 26 has substantially the form of a wiper rod with a rectangular cross section. The fifth connecting element 38 thereof is integrally formed with said fifth wiper arm and has a free end having an offset 150. A detent aperture 152 is situated offset toward the wiper arm 26 in the longitudinal direction 124. The detent aperture 152 latches in the end position with the detent cam 154 of the protective cap 46 when the end side 151 of the offset fifth connecting element 38 adjoins with the stop 142 on the inner side of the end wall of the closure cap 44. During assembly, the fifth connecting element 38 is pushed through the opening 108 of the protective cap 46, wherein the free end comprising the offset 150 initially pushes back the detent cam 154 and the play compensation button 50.

Figure 14:
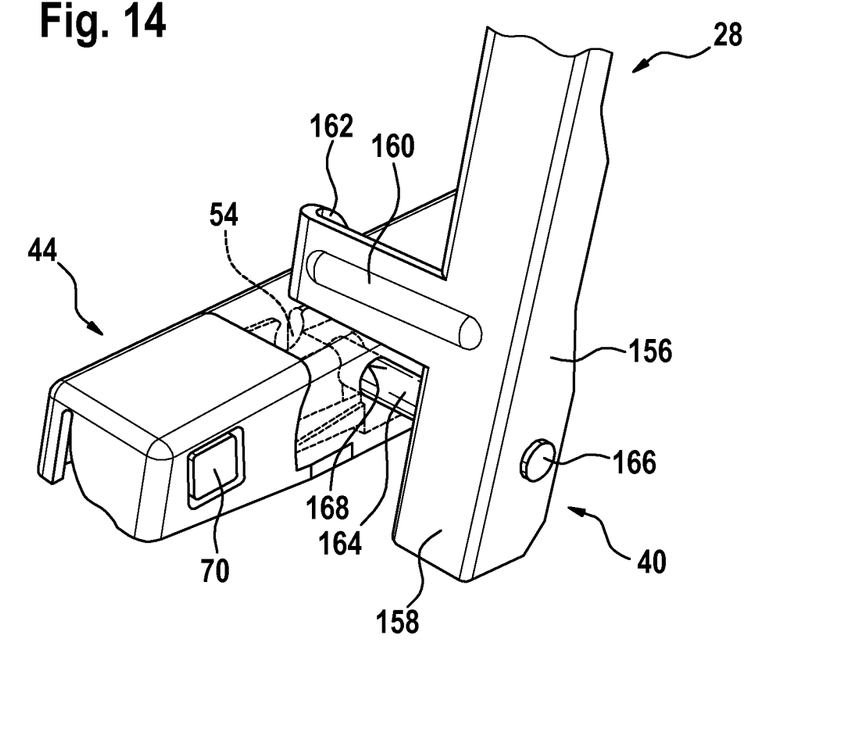

The sixth wiper arm 28 represents by means of the integrally formed connecting element 40 thereof a so-called sidelock connection to the wiper blade 10, in which the wiper arm 28 runs laterally offset to the wiper blade 10. The sixth connecting element 40 has a substantially U-shaped cross-sectional profile, which is formed from two side walls 156 and a top wall 158, which connects the two side walls 156 to each other. A bearing pin 164 is riveted into both side walls 156. The rivet head is denoted with the reference numeral 166. The bearing pin 164 is pushed, in a position of the wiper blade 10 that is pivoted through 90 degrees, through the bearing aperture 168 into the side wall of the protective cap 46 into the open hub 54 of the base element 42 and is retained by the assembly gaps 62 which are of clip-like design. Offset with respect to the sixth wiper arm 28 in the longitudinal direction, a bridge 160 is integrally formed on the sixth connecting element 40 on the side of the adapter 16. Said bridge overlaps the protective cap 46 and retains the adapter 16 with an angled end 162 when the wiper blade 10 is pivoted back into the initial position thereof.

Whereas the third to the sixth wiper arm 22, 24, 26, 28 can be mounted with the corresponding connecting elements 34, 36, 38, 40 if the adapter 16 runs substantially parallel to the wiper blade 10, the adapter 16 for mounting the first or second wiper arm 18, 20 is rotated through an angle α, preferably between 4° and 8° with respect to the end of the wiper blade 10. By means of the varying assembly angle α, a sufficient clearance is obtained to mount the first and second wiper arm 18, 20 and to insert the third to the fifth connecting element 34, 36, 38 of the third to the fifth wiper arm 22, 24, 26 through the aperture 108 on the end face into the adapter 16 and to press the play compensation button 50 downwards.

What is claimed is:

1. An adapter (16) for connecting a connecting element (30, 32, 34, 36, 38, 40) at the end of a wiper arm (18, 20, 22, 24, 26, 28) to a wiper blade (10) wherein the adapter (16) has a base element (42), characterized in that the base element (42) has a U-shaped cross-sectional profile which is formed from a base (56) and two side walls (48) and which, at an end side thereof which faces away from the wiper arm (18, 20, 22, 24, 26, 28), is closed off by a closure cap (44), in that spring arms (68) are integrally formed on the side walls (48) of the base element (42), which the spring arms (68) extend in a longitudinal direction (124) toward the closure cap (44), engage into the closure cap and latch with buttons (70) into cutouts (84) in side walls (82) of the closure cap (44), the cutouts (84) being through openings that extend through the side walls (82) and are completely surrounded by material of the side walls (82), and in that longitudinally directed bars (78) are arranged on inner sides of the side walls (82) of the closure cap (44), which the bars are guided in a movable manner in cutouts (60) of the side walls (48) of the base element (42) when the buttons (70) are released, and which the bars, in a closed state, block transversely running assembly gaps (62) and close off receiving chambers (66) for locking cams (104, 120).

2. The adapter (16) according to claim 1, characterized in that the bars (78), in the closed state, engage with free ends thereof in cutouts (92) in the base element (42) on sides of the assembly gaps (62) opposite to end sides (90) of the bars (78).

3. The adapter (16) according to claim 2, characterized in that the cutouts (92) on the sides of the gaps have a detent (64) on edges thereof, said detent latching with a detent edge (65) on an edge of the end side (90) of each bar (78).

4. The adapter (16) according to claim 1, characterized in that stops (72) are provided on the spring arms (68), the stops delimiting opening movement of the closure cap (44).

5. The adapter (16) according to claim 4, characterized in that the spring arms (68) run outwardly offset relative to the side walls (48) and form shoulders (69), which serve as stops for end sides (127, 129) of the connecting element (34, 36).

6. The adapter (16) according to claim 1, characterized in that the base element (42) has a play compensation button (50) in a region of the end side thereof, which faces the wiper arm (18, 20, 22, 24, 26, 28), said button being connected via a spring tongue (52) to an intermediate base (58), which connects the two side walls (48) of the base element (42).

7. The adapter (16) according to claim 6, characterized in that the play compensation button (50) has a detent edge (51) on a side facing the spring arms (68) and serves as a further securing means for the connecting element (30, 32) of the wiper arm (18, 20).

8. The adapter (16) according to claim 6, characterized in that the base element (42) has, in a region of the play compensation button (50), a play compensation recess (74) on outer sides of the side walls (48).

9. The adapter (16) according to claim 1, characterized in that end sides (99) of the side walls (82) of the closure cap (44) which face the wiper arm (18, 20, 22, 24, 26, 28) are concave and can serve as stops for the connecting element (30, 32) of the wiper arm (18, 20) or of a protective cap (46).

10. The adapter (16) according to claim 9, characterized in that the protective cap (46) has a U-shaped cross-sectional profile formed from a top wall (96) and two side walls (94) and encloses the base element (42) laterally and from above with the side walls (94) of the protective cap and the top wall (96) of the protective cap and with convex end sides (98) of the side walls (94) of the protective cap flushly adjoining opposing concave end sides (99) of the side walls (82) of the closure cap (44), wherein, in an assembled state, locking cams (104) on inner sides of the side walls (94) of the protective cap (46) engage in receiving chambers (66) at an end of the assembly gaps (62) and wherein an end side (100) of the protective cap (46) facing the wiper arm (18, 20, 22, 24, 26, 28) has an aperture (108).

11. The adapter (16) according to claim 10, characterized in that the protective cap (46) has lateral, inwardly resiliently pliable detent wings (106), which have angled stops (140) facing the closure cap (44) and stops (142) running approximately perpendicularly to the longitudinal direction (124).

12. The adapter (16) according to claim 10, characterized in that the protective cap (46) has a detent cam (154) in a region of the aperture (108) on the end side.

13. The adapter (16) according to claim 9, characterized in that the base element (42) comprises a hub (54) which is open towards a top and above which the side walls (48) of the base element (42) project, wherein the side walls (48) in the region of the hub (54) are clip-like and the protective cap (46) has a bearing aperture (168) at least in one side wall (94).

14. The adapter (16) according to claim 1, characterized in that a stop (142) for an end side (151) of the connecting element (38) is provided on an inner side of the end wall (86) of the closure cap (44).

15. The adapter (16) according to claim 1, characterized in that when mounting one type of wiper arm (18, 20) in comparison to mounting another type of wiper arm (22, 24, 26, 28), said adapter assumes a position relative to the wiper blade (10) which is rotated about an angle ($\alpha$) with respect to a free end of said wiper blade (10).

16. The adapter (16) according to claim 15, characterized in that the angle ($\alpha$) lies in the range between 4° and 8°.

17. An adapter (16) for connecting a connecting element (30, 32, 34, 36, 38, 40) at the end of a wiper arm (18, 20, 22, 24, 26, 28) to a wiper blade (10) wherein the adapter (16) has a base element (42), characterized in that the base element (42) has a U-shaped cross-sectional profile which is formed from a base (56) and two side walls (48) and which, at an end side thereof which faces away from the wiper arm (18, 20, 22, 24, 26, 28), is closed off by a closure cap (44), in that spring arms (68) are integrally formed on the side walls (48) of the base element (42), which spring arms (68) extend in a longitudinal direction (124) toward the closure cap (44), engage into the closure cap and latch with buttons (70) into cutouts (84) in side walls (82) of the closure cap (44) and in that longitudinally directed bars (78) are arranged on inner sides of the side walls (82) of the closure cap (44), which bars are guided in a movable manner in cutouts (60) of the side walls (48) of the base element (42) when the buttons (70) are released, and which bars, in a closed state, block transversely running assembly gaps (62) and close off receiving chambers (66) for locking cams (104, 120), characterized in that stops (72) are provided on the spring arms (68), the stops delimiting opening movement of the closure cap (44), and characterized in that the spring arms (68) run outwardly offset relative to the side walls (48) and form shoulders (69), which serve as stops for end sides (127, 129) of the connecting element (34, 36).

18. The adapter (16) according to claim 17, characterized in that the bars (78), in the closed state, engage with free ends thereof in cutouts (92) in the base element (42) on sides of the assembly gaps (62) opposite to end sides (90) of the bars (78).

19. The adapter (16) according to claim 18, characterized in that the cutouts (92) on the sides of the gaps have a detent (64) on edges thereof, said detent latching with a detent edge (65) on an edge of the end side (90) of the bar (78).

* * * * *